May 24, 1932.  J. A. MARTIN  1,860,196
GEAR SHIFTING MECHANISM
Filed May 21, 1928  3 Sheets-Sheet 1
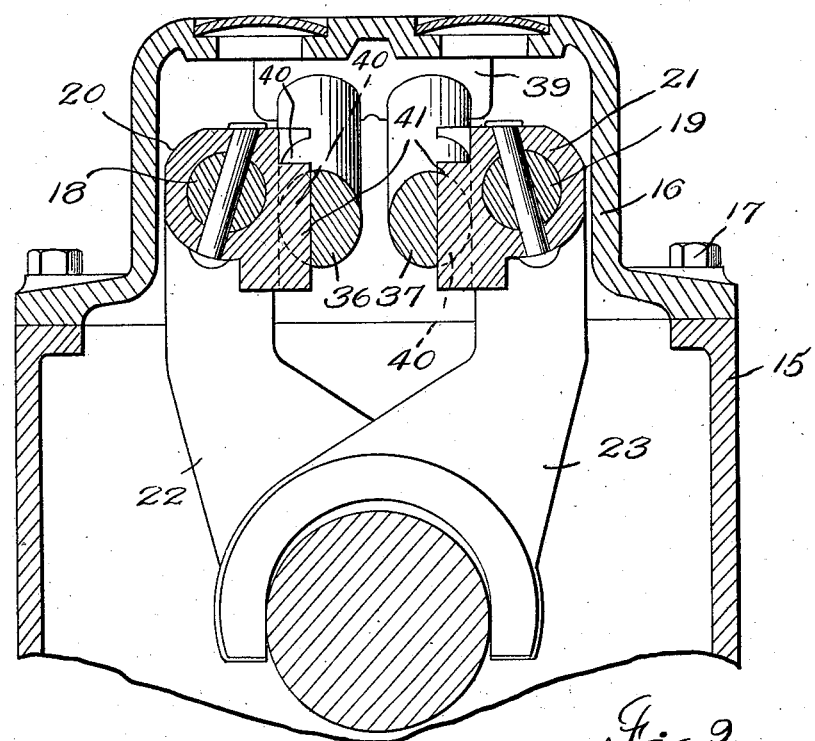
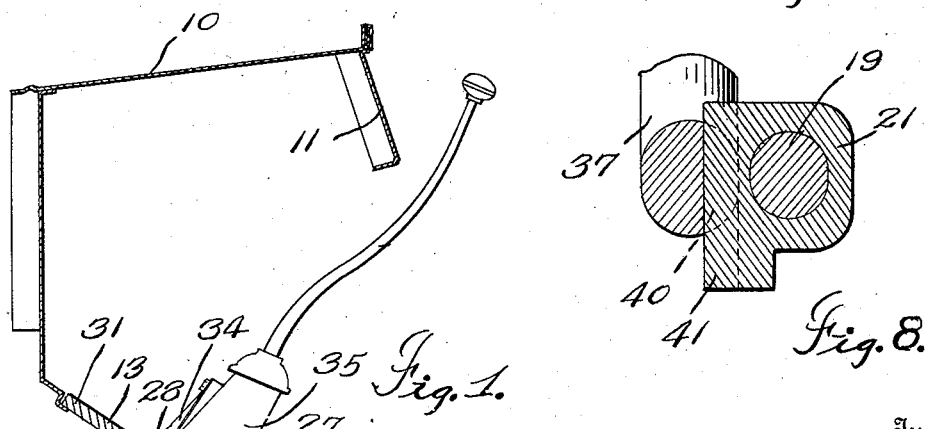
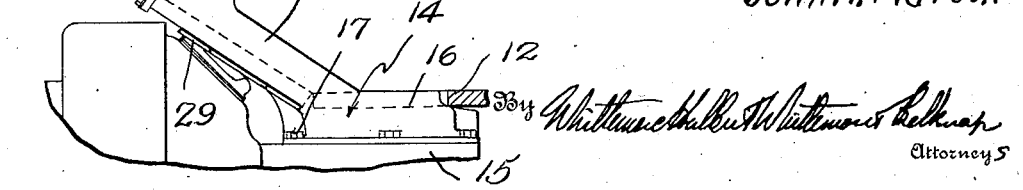

May 24, 1932. J. A. MARTIN 1,860,196
GEAR SHIFTING MECHANISM
Filed May 21, 1928   3 Sheets-Sheet 2
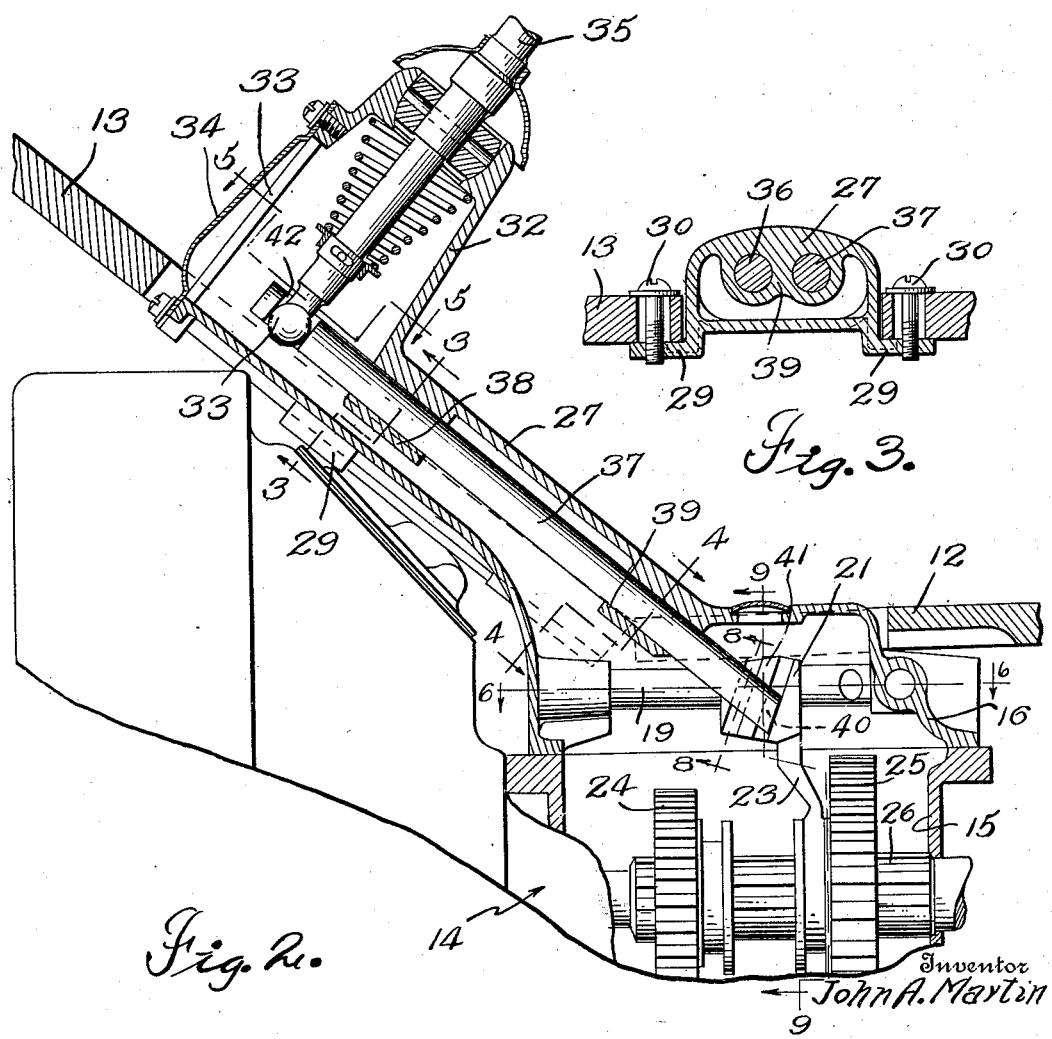
Inventor
John A. Martin
Attorneys May 24, 1932.  J. A. MARTIN  1,860,196
GEAR SHIFTING MECHANISM
Filed May 21, 1928  3 Sheets-Sheet 3

Inventor
John A. Martin

Attorneys

Patented May 24, 1932

1,860,196

UNITED STATES PATENT OFFICE

JOHN A. MARTIN, OF DETROIT, MICHIGAN, ASSIGNOR, BY MESNE ASSIGNMENTS, TO CHRYSLER CORPORATION, A CORPORATION OF DELAWARE

GEAR SHIFTING MECHANISM

Application filed May 21, 1928. Serial No. 279,493.

This invention relates to gear shifting devices and finds particular utility for use in connection with motor vehicle construction for manipulating the gears in the transmission forming a part of the vehicle.

The invention has as one of its primary objects to provide a gear shifting mechanism of the above type distinguished by its simplicity of construction and operation which not only enhances its value both mechanically and commercially, but provides a design of strong and durable nature.

Motor vehicles, as now commercially produced, require the presence of a gear unit interposed between the power plant and driving wheels for transmitting power to the latter in stages. This gear unit, which is commonly known as the transmission, usually assumes a position adjacent to and below the level floor board of the vehicle and as is customary, the control lever for the transmission projects through the level floor board in direct alignment with the doors of the vehicle. Thus, the control lever, to a certain extent, restricts free access into and out of the driver's compartment and oftentimes hinders the driver in properly manipulating the gears owing to the proximity of the control lever to the passengers in the driver's compartment.

It is, therefore, one of the primary objects of this invention to eliminate the above noted disadvantages by providing a remote control for the gears in the transmission which includes associating suitable mechanism with the transmission capable of shifting the gears therein from an isolated point in the driver's compartment.

Many of the advantages and much of the commercial value and acceptability of the invention is attributed to the novel construction of the gear shifting mechanism, these advantages being obtained particularly because of the simplicity of the mechanism and the minimum number of parts employed. This enables the device to be economically and quickly manufactured and easily assembled and renders the same strong and durable. The invention, therefore, depends for some of its advantages upon the specific details of construction illustrated and about to be described.

In the drawings:

Figure 1 is a fragmentary sectional view through a portion of a vehicle showing a gear shifting mechanism constructed in accordance with my invention;

Figure 2 is a sectional view through the gear shifting mechanism and a portion of the transmission;

Figure 3 is a sectional view taken on the line 3—3 of Figure 2;

Figure 4 is a sectional view taken on the plane indicated by the line 4—4 of Figure 2;

Figure 8 is a detail sectional view taken on the plane indicated by the line 8—8 of Figure 2; and Figure 9 is a sectional view taken on the plane indicated by the line 9—9 of Figure 2.

Figure 7:
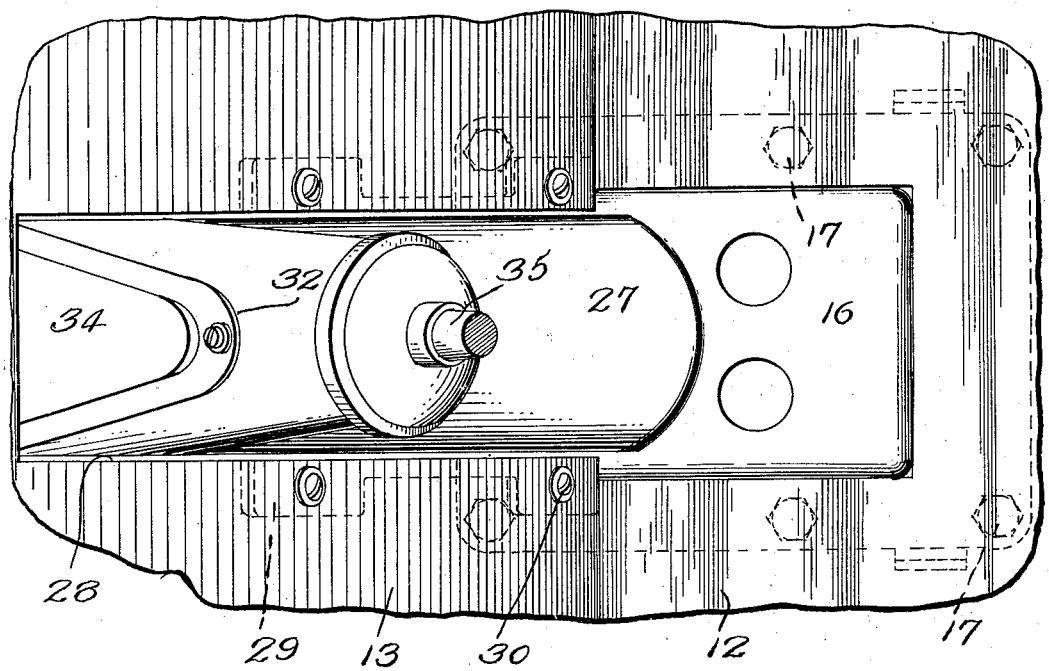
Figure 7 is a top plan view of the construction shown in Figure 2.

Referring now to the drawings, it will be noted that there is illustrated fragmentarily in Figure 1 a portion of a vehicle including a cowl 10, instrument board 11, floor board 12 and toe-board 13. The latter, as is customary in vehicle body design, is inclined with respect to the floor board 12 and projects a substantial distance beneath the cowl and instrument board. Disposed beneath the floor portion 12 is a suitable transmission housing 14 comprising complementary sections 15 and 16 secured together by means of the bolts 17. Arranged within the top section 16 of the housing are the usual shifting shafts 18 and 19 carrying yokes 20 and 21, respectively, having gear shifting forks 22 and 23 depending therefrom and engageable with the change speed gears 24 and 25, respectively, slidably and non-rotatively mounted upon the spline shaft 26, the latter being journaled in the section 15 of the casing in accordance with the usual practice.

As shown, the top housing section 16 is formed with an angularly arranged extension 27 communicating with and terminating at a point remote from the transmission housing 14. In the present instance, the extension 27 is inclined upwardly from the housing 14 and is arranged in a plane substantially parallel to the toe-board 12, the latter being slotted as at 28 to receive the extension 27 which, as will be noted upon reference to Figures 3 and 4 of the drawings, is provided with lateral flanges 29 secured to the bottom surface of the toe-board, adjacent the slot 28 by means of the bolts 30. The upper end of the extension 27 preferably assumes a position adjacent the forward edge 31 of the toe-board and terminates in an upstanding projecting portion 32 having an opening 33 in the front wall thereof normally closed by the detachable plate 34.

For controlling the operation of the transmission, a suitable control lever 35 is provided. The lower end of this lever extends into the portion 32 of the extension 27 and is universally connected to the latter in the customary and well known manner. With the foregoing arrangement, it will be noted that the lower end portion of the control lever is positioned adjacent the top edge of the toe-board so as to be beneath the cowl and instrument board and consequently out of alignment with the passage between the usual doors, not shown, of the vehicle. The upper portion of the control lever, however, assumes a position adjacent the driver so that the latter may conveniently grasp the same to operate the transmission. Moreover, as will be understood, the arrangement is such that the lever will clear the lower edge of the instrument panel in any of its various positions of adjustment.

Figure 6:
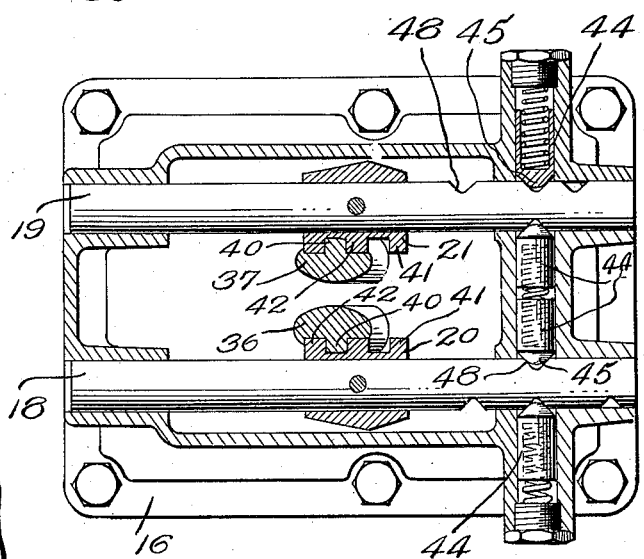
Figure 6 is a sectional view taken on the line 6—6 of Figure 2.
Figure 5:
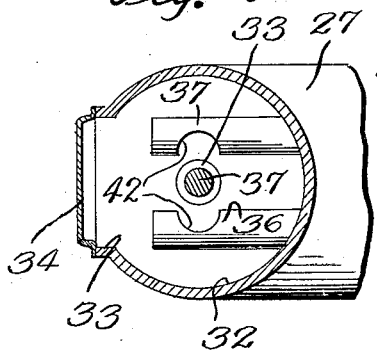
Figure 5 is a sectional view taken on the plane indicated by the line 5—5 of Figure 2.

In order to establish a connection between the lower end of the control lever 35 and yokes 20 and 21, a pair of laterally spaced shafts 36 and 37 is provided, these shafts being arranged in the same plane which is preferably parallel to the toe-board and are slidably supported in the spaced bearing portions 38 and 39 formed in the extension 27. The lower ends of the shafts 36 and 37 extend into the transmission housing 14 and are provided with teeth 40 inclined with respect to the axes of the shafts and adapted to mesh with similar teeth 41 formed upon the inner ends of the yokes 20 and 21. As will be noted from Figure 2 of the drawings, the teeth 40 and 41 are arranged at such an angle that a perpendicular to the contacting surfaces thereof is parallel to the bisector of the angle formed by the axes of the shafts 36 and 37 and the shafts 18 and 19. This construction enables the shafts 36 and 37 to exert a direct force upon the yokes in the direction of movement thereof and accordingly facilitate the shifting of the gears 24 and 25. Moreover it will further be noted that the teeth on the shafts 36 and 37 are machined in the round stock and consequently do not interfere with the withdrawal of the shifting shafts from the housing. The upper ends of the shafts 36 and 37 are preferably slotted as at 42 for receiving the ball 33 formed upon the lower end of the control lever 35. The inner end portion of the latter, as will be noted by reference to Figure 6 of the drawings, assumes a position between the shafts 36 and 37. The arrangement being such that when the control lever is in engagement with the slot formed in the shaft 36, for example, it will be out of contact with the shaft 37. In other words, the control lever is so mounted with respect to the shafts 36 and 37 as to selectively engage the same to effect a shifting of the gears within the transmission housing.

Arranged within the section 16 of the transmission housing are the spring influenced detents 44 having wedge-shaped ends 45 adapted to engage in suitable recesses 48 formed in the sliding shafts 18 and 19 for yieldingly resisting movement of the latter and thereby preventing accidental disengagement of the transmission gears.

Referring now to the operation of the device and assuming that the operator desires to change gears in the transmission by moving the gear 25 rearwardly, the lever 35 is merely shifted laterally to engage the ball 33 in the slot 42 of the shaft 37. The lower end of the lever 27 is then caused to move rearwardly and owing to the sliding tooth connection heretofore pointed out with some particularity between the shaft 37 and yoke 21 upon the shaft 19, the latter will be moved rearwardly and due to the connection between the yoke and gear 25, the latter will also be moved rearwardly. On the other hand, if it is desired to move the gear 25 forwardly, the lower end of the control lever 35 is moved forwardly and owing to the connection heretofore pointed out between the lever 35 and gear 25, the latter will be shifted forwardly. In a like manner if it is desired to manipulate the gear 24, the lever 35 is moved into engagement with the shaft 36 and the latter is slid forwardly or rearwardly to effect the desired movement of the gear 24.

Thus from the foregoing, it will be readily apparent that I have provided an arrangement which renders possible moving the connection between the usual control lever and transmission from its customary place upon the level floor board directly above the transmission to a point remote from the transmission and out of alignment with the passage between the doors in the driver's compartment. It will further be noted that I have accomplished the foregoing function in an economical manner and with a comparatively simple mechanism. Moreover, owing to the design and particular arrangement of the parts involved, the amount of friction is reduced to a minimum with the result that comparatively little effort is required to manipulate the gears.

What I claim as my invention is:

1. In a vehicle, the combination with a substantially horizontally disposed floor portion and a transmission positioned below the said floor portion, of a second floor portion at an angle to the floor portion aforesaid, a control lever arranged upon the angularly disposed floor portion and a member slidably mounted upon the last mentioned floor portion having one end adapted to be engaged by said lever and the opposite end extending into said transmission for shifting the gears therein.

2. In a vehicle, the combination with a transmission including a shifting fork, of a reciprocal shaft angularly arranged with respect to the transmission and having one end slidably connected to said shifting fork and the opposite end terminating at a point remote from the transmission, and means engageable with the free end of said shaft for reciprocating the same to actuate the said shifting fork.

3. In a vehicle, the combination with a transmission including a plurality of shifting forks operatively connected to the gears for shifting the latter, of a plurality of laterally spaced shafts corresponding in number to the number of shifting forks and having a sliding connection with the latter, said shafts extending outwardly from the transmission and terminating at a point remote from the same, and a control lever mounted at the remote ends of said shafts and having one end thereof disposed therebetween and selectively engageable therewith for operating the shafts to in turn actuate the said shifting forks.

4. In a vehicle, the combination with an angularly arranged toe-board and a transmission positioned to the rear of said toe-board, of means for actuating said transmission including a pair of members reciprocable in a plane substantially parallel to the toe-board and having the lower ends thereof extending into the transmission and operatively connected to the gears in the latter, the upper ends of said shafts terminate at a point remote from the transmission adjacent the forward edge of the toe-board, and means positioned upon the toe board adjacent the free ends of the shafts and engageable therewith to effect a reciprocation of the same for shifting the gears in the transmission.

5. In a vehicle, the combination with a transmission and a toe-board angularly arranged with respect to said transmission, of a housing communicating with the transmission and extending therefrom in a plane parallel to the toe-board and secured to the latter, a pair of laterally spaced shafts slidably mounted in said housing having the lower ends thereof operatively connected to the gears in the transmission for shifting the same, and a control lever mounted upon the end of the housing remote from the transmission and adapted to selectively engage the free ends of the shafts for sliding the same to effect a shifting of the gears aforesaid.

6. In a vehicle, the combination with a transmission including a pair of slidably mounted shifting forks, of teeth upon each of said forks arranged at angle to the direction of movement of said forks, a pair of laterally spaced shafts reciprocable in a fixed path also angularly arranged to the direction of movement of said forks and having teeth upon the lower ends thereof engaging the teeth formed upon said forks, the upper ends of said shafts terminating at a point remote from the transmission and adapted to be selectively engaged by a control lever operable to reciprocate the said shafts to effect a sliding movement of said forks.

7. In a vehicle, the combination with a transmission having shiftable gears therein, of means for shifting said gears including a shifting fork, means for actuating said shifting fork including a reciprocable shaft inclined to the path of movement of the fork and having one end slidably connected to said fork and the opposite end terminating at a point remote from the transmission, and means engageable with the free end of the shaft for actuating the latter.

8. In a vehicle, the combination with a transmission having shiftable gears therein, of means for shifting said gears including a shifting fork, means for actuating said shifting fork including a reciprocable shaft inclined to the path of movement of the fork and extending into the transmission and having a slidable interlocking connection with the shifting fork, and means engageable with the shaft for actuating the latter.

9. In a vehicle, the combination with a transmission having shiftable gears therein, of means for shifting said gears including a shifting fork, means for actuating said shifting fork including a reciprocable shaft having an inclined abutment adjacent one end thereof adapted to slidably engage a corresponding abutment upon the shifting fork and means positioned remote from the transmission for reciprocating said shaft.

10. In a vehicle, the combination with a transmission having shiftable gears therein, of means for shifting said gears including a shifting fork, means for actuating said shifting fork including a reciprocable shaft extending at an angle to the path of movement of the fork, and means establishing a connection between the shaft and fork, said means including cooperating abutting surfaces upon the shaft and fork and inclined at an angle to directions of movement of both the latter members.

11. In a vehicle, the combination with a transmission housing having shiftable gears therein and having an inclined extension, of means for shifting the gears aforesaid from a point remote from the transmission, said means including a shaft carried by the extension for reciprocation in a direction inclined at an angle corresponding to the angle of inclination of the extension.

12. In a vehicle, the combination with a transmission and an inclined toe-board in advance of the transmission, of a rigid shaft mounted for reciprocation in a plane substantially parallel to the toe-board and having one end extending into the transmission and slidably connected to one of the gears therein, and means positioned adjacent the forward end of the toe-board adapted to engage the free end of said shaft for actuating the same to shift the gears in said transmission.

13. In a vehicle, the combination with a transmission housing and a toothed element mounted within the housing for sliding movement in the direction of its axis, means for actuating the toothed element from a point remote from the transmission including, a rigid shaft having a portion arranged with its axis inclined at an angle to the axis of said element and mounted for reciprocation in the direction of the aforesaid axis thereof, means operatively connecting one end of said shaft to said element, and means engageable with the opposite end of said shaft for reciprocating the latter.

14. In a vehicle, the combination with a transmission housing and a plurality of toothed elements mounted within the housing for sliding movement in the direction of their axes, of means for actuating the toothed elements from a point remote from the transmission housing including, a plurality of rigid shafts corresponding in number to the number of slidable toothed elements and mounted for reciprocation in a plane inclined at an angle to the paths of movement of said toothed elements, means for respectively connecting the inner ends of the shafts to the toothed elements aforesaid, and means engageable with the outer ends of said shafts for selectively actuating the same.

15. In a vehicle, the combination with a transmission housing and a toothed element mounted within the housing for sliding movement in the direction of its axis, of an extension upon said housing terminating at a point remote from the latter and inclined at an angle to the path of sliding movement of the toothed element, a shaft mounted within the extension for reciprocation in a plane substantially parallel thereto, means operatively connecting the inner end of the shaft to said toothed element, and a control lever mounted upon the outer end of said extension and having a portion engageable with the adjacent end of said shaft for reciprocating the same.

In testimony whereof I affix my signature.

JOHN A. MARTIN.